US007328253B2

(12) United States Patent
Kayahara

(10) Patent No.: US 7,328,253 B2
(45) Date of Patent: Feb. 5, 2008

(54) SERVICE PROVIDING SYSTEM, SERVICE PROVIDING TERMINAL, CLIENT TERMINAL, AND STORAGE MEDIUM

(75) Inventor: Naoki Kayahara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 672 days.

(21) Appl. No.: 09/983,737

(22) Filed: Oct. 25, 2001

(65) Prior Publication Data

US 2002/0062448 A1 May 23, 2002

(30) Foreign Application Priority Data

Oct. 26, 2000 (JP) ............................ 2000-327787

(51) Int. Cl.
*G06F 15/16* (2006.01)

(52) U.S. Cl. ....................................... 709/219; 718/100

(58) Field of Classification Search ................ 709/219, 709/217, 203, 213, 216, 206, 223, 231; 715/500, 715/501, 764, 705; 705/51; 455/414; 718/100; 707/3, 10

See application file for complete search history.

(56) References Cited

U.S. PATENT DOCUMENTS

| | | | | |
|---|---|---|---|---|
| 5,345,587 | A * | 9/1994 | Fehskens et al. | 718/102 |
| 5,671,341 | A * | 9/1997 | Kashiwazaki et al. | 358/1.13 |
| 5,754,784 | A * | 5/1998 | Garland et al. | 709/219 |
| 5,754,938 | A * | 5/1998 | Herz et al. | 725/116 |
| 5,774,671 | A * | 6/1998 | Satoh | 709/231 |
| 5,828,375 | A * | 10/1998 | Nomura et al. | 715/764 |
| 5,905,866 | A * | 5/1999 | Nakabayashi et al. | 709/223 |
| 5,974,409 | A * | 10/1999 | Sanu et al. | 707/3 |
| 5,983,218 | A * | 11/1999 | Syeda-Mahmood | 707/3 |
| 5,987,480 | A * | 11/1999 | Donohue et al. | 715/501.1 |
| 5,999,975 | A | 12/1999 | Kittaka et al. | |

(Continued)

FOREIGN PATENT DOCUMENTS

JP A-09-120405 5/1997

(Continued)

OTHER PUBLICATIONS

Integrating Windows streaming media technologies into a virtual classroom environment Stephen Huang; Hui Hu; Multimedia Software Engineering, 2000. Proceedings. International Symposium on Dec. 11-13, 2000 pp. 411-418.*

(Continued)

*Primary Examiner*—Thong Vu
(74) *Attorney, Agent, or Firm*—Oliff & Berridge, PLC

(57) ABSTRACT

The invention provides a service-providing system that is suited to increase security of a user's privacy by preventing a user's personal information from be externally leaked out. A service-providing terminal sends a content list to a client terminal in response to a service-providing request, and when receiving a selection result of the digital content from the client terminal, selects the digital content to distribute from a plurality of digital content based on the selection result, and distributes the selected digital content to the client terminal. The client terminal is provided with a user information registration, in which user information is registered, and when receiving the content list from the service-providing terminal, selects a content-ID from the content list based on the user information in the user information registration, and sends a selection result to the service-providing terminal.

14 Claims, 11 Drawing Sheets

U.S. PATENT DOCUMENTS

| | | | | |
|---|---|---|---|---|
| 6,029,195 | A * | 2/2000 | Herz | 725/116 |
| 6,092,091 | A | 7/2000 | Sumita et al. | |
| 6,195,654 | B1 * | 2/2001 | Wachtel | 707/3 |
| 6,216,173 | B1 * | 4/2001 | Jones et al. | 715/705 |
| 6,249,806 | B1 * | 6/2001 | Kohda et al. | 709/206 |
| 6,269,395 | B1 * | 7/2001 | Blatherwick et al. | 709/219 |
| 6,425,104 | B1 * | 7/2002 | Toumiya | 714/738 |
| 6,694,316 | B1 * | 2/2004 | Langseth et al. | 707/10 |
| 6,698,023 | B2 * | 2/2004 | Levitan | 725/135 |
| 6,728,758 | B2 * | 4/2004 | Sato | 709/206 |
| 6,829,474 | B1 * | 12/2004 | Adachi | 455/414.1 |
| 6,904,408 | B1 * | 6/2005 | McCarthy et al. | 705/2 |
| 6,957,429 | B1 * | 10/2005 | Sekijima et al. | 718/100 |
| 7,007,034 | B1 * | 2/2006 | Hartman et al. | 707/102 |
| 7,095,871 | B2 * | 8/2006 | Jones et al. | 382/100 |
| 2001/0051996 | A1 * | 12/2001 | Cooper et al. | 709/217 |
| 2002/0010679 | A1 * | 1/2002 | Felsher | 705/51 |
| 2002/0023132 | A1 * | 2/2002 | Tornabene et al. | 709/205 |
| 2002/0059624 | A1 * | 5/2002 | Machida et al. | 725/91 |
| 2002/0120685 | A1 * | 8/2002 | Srivastava et al. | 709/203 |
| 2004/0199867 | A1 * | 10/2004 | Brandenborg | 715/500.1 |

FOREIGN PATENT DOCUMENTS

| | | |
|---|---|---|
| JP | A-10-143540 | 5/1998 |
| JP | A-10-301945 | 11/1998 |
| JP | A-10-326289 | 12/1998 |
| JP | A-11-312190 | 11/1999 |
| JP | A-2000-011036 | 1/2000 |
| JP | A-2000-250992 | 9/2000 |

OTHER PUBLICATIONS

Software project management and measurement on the World-Wide-Web (WWW); Callahan, J.; Ramakrishnan, S.; Enabling Technologies: Infrastructure for Collaborative Enterprises, 1996. Proceedings of the 5th Workshop on Jun. 19-21, 1996 pp. 156-161.*

WebOnCOLL: medical collaboration in regional healthcare networks Chronaki, C.E.; Katehakis, D.G.; Zabulis, X.C.; Tsiknakis, M.; Orphanoudakis, S.C.; Information Technology in Biomedicine, IEEE Transactions on vol. 1, Issue 4, Dec. 1997 pp. 257-269.*

* cited by examiner

300 CONTENT LIST

| CONTENT-ID | TITLE |
|---|---|
| 1 | COMPANY A HAS RELEASED A DESKTOP PC WITH 333 MHz CELERON ON BOARD FOR COMPANY USE. |
| 2 | COMPANY B HAS RELEASED A NOTEBOOK PC OF WNDOWS 95 MODEL HAVING A PRICE OF 300 THOUSAND YEN OR MORE. |
| 3 | COMPANY C HAS RELEASED A NOTEBOOK PC OF Linux MODEL. THE PRICE RANGES FROM 200 THOUSAND YEN. |
| 4 | COMPANY D HAS RELEASED A DESKTOP PC HAVING A PRICE LESS THAN 100 THOUSAND YEN. |
| 5 | COMPANY E HAS RELEASED A MOBILE PHONE ON WHICH Java IS INSTALLED. |
| 6 | COMPANY F HAS ANNOUNCED A CABLE MODEM. |

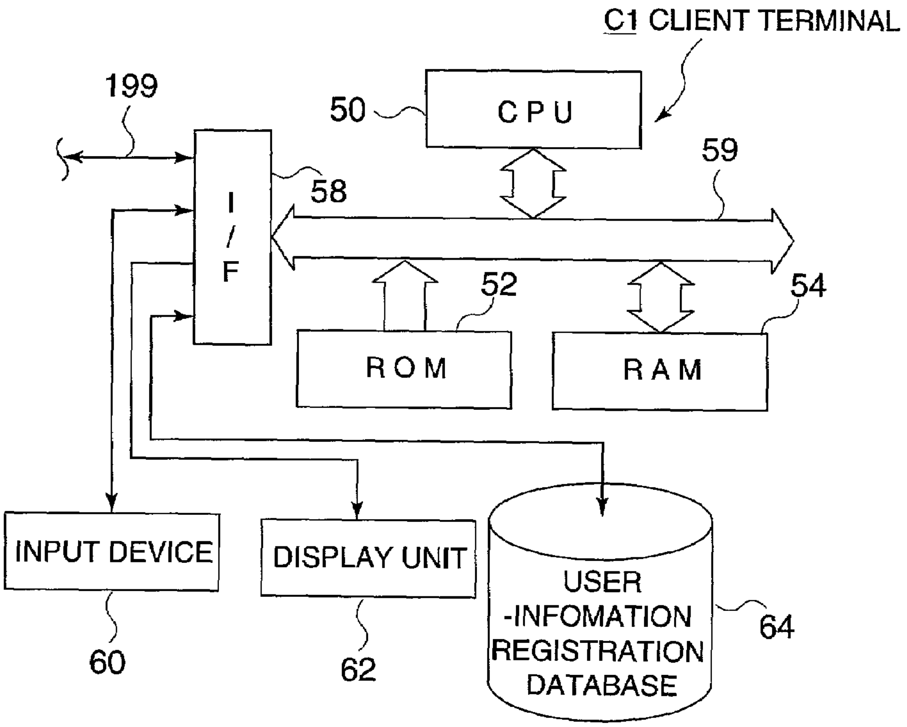

FIG. 5

320 USER-PROFILE TABLE

| SEVERITY (322) | REQUEST (324) |
| --- | --- |
| 0.5 | WANT A NOTEBOOK PC ON WHICH WINDOWS RUNS. |
| 0.8 | SCHEDULED TO GET THE BUDGET OF ABOUT 200 THOUSAND YEN OUT OF THE NEXT BONUS. |
| 0.4 | WANT TO CONNECT PC TO THE INTERNET BY A CABLE MODEM. |

DAILY NEWS

DEAR SIR ☐☐☐☐

XXXX YEAR XX MONTH XX DAY

COMPANY C HAS RELEASED A NOTEBOOK PC OF Linux MODEL. THE PRICE RANGES FROM 200 THOUSAND YEN.

500

COMPANY D HAS RELEASED A DESKTOP PC HAVING A PRICE LESS THAN 100 THOUSAND YEN.

502

COMPANY F HAS ANNOUNCED A CABLE MODEM.

504

FOR INQUIRIES ABOUT THIS NEWS, PLEASE CONTACT EDITORIAL DESK.

340 CONTENT-REFERENCE INFORMATION REGISTRATION TABLE 342 344 346

| CONTENT-ID | CONTENT-ID | REFERENCE RATIO |
|---|---|---|
| 1 | 4 | 0.2 |
| 2 | 3 | 0.5 |
| 3 | 5 | 0.7 |

320 USER-PROFILE TABLE 322 324

| SEVERITY | REQUEST |
|---|---|
| 0.5 | WANT A NOTEBOOK PC ON WHICH WNDOWS RUNS. |
| 0.8 | SCHEDULED TO GET THE BUDGET OF 200 THOUSAND YEN OUT OF THE NEXT BONUS. |
| 0.4 | WANT TO CONNECT PC TO THE INTERNET BY A CABLE MODEM. |
| 0.35 | A MOBILE PHONE ON WHICH Java IS INSTALLED. |

ADDED ⇨ (0.35 row)

FIG. 13

340 CONTENT-REFERENCE INFORMATION REGISTATION TABLE 342 344 346

| CONTENT-ID | CONTENT-ID | REFERENCE RATIO |
|---|---|---|
| 1 | 4 | 0.2 |
| 2 | 3 | 0.5 |
| 3 | 5 | 0.7 |
| 3 | 4 | 0.1 |
| 3 | 6 | 0.1 |
| 4 | 6 | 0.1 |

ADDED (last three rows)

FIG. 15

SERVICE PROVIDING SYSTEM, SERVICE PROVIDING TERMINAL, CLIENT TERMINAL, AND STORAGE MEDIUM

BACKGROUND OF THE INVENTION

1. Field of the Invention

The present invention relates to a system for providing a user with a service corresponding to a service content which meets the interests and preferences of the user among a plurality of service contents, to a terminal and to a storage medium. More particularly, the invention relates to a service-providing system suited to increase security of a user's privacy by preventing a user's personal information from externally leaking out, as well as to a service-providing terminal, to a client terminal, and to a storage medium.

2. Description of the Related Art

An information-providing system disclosed in Unexamined Patent Application Publication No. 10-326289 is an exemplary conventional technique for providing a user with a service corresponding to a content suited for the user's interest and preferences among a plurality of service contents.

In this system, an information-provider terminal which is used by an information provider who provides information, and an information-user terminal which is used by an information user who receives information, can communicate with each other over a network, and information is presented between the information-provider terminal and the information-user terminal. The information-user terminal holds a user attribute value which represents a user's interest by a numeric value in a user attribute storing part, and sends the information identification of the information desired to be displayed and a user attribute value to the information-provider terminal. The information-provider terminal holds an information attribute value which represents the content of information by a numeric value in an information attribute storing part, and reflects an information attribute value of the information identification and the user attribute value, which are received from the information-user terminal, so as to update each of the values. The information-provider terminal selects the information using the updated information attribute value and user attribute value and returns a list of the selected information, the information specified by the user, and the user attribute value to the information-user terminal.

It is thereby possible to dynamically grasp a user's interest of the information and provide accurate information corresponding to the user's interest.

However, the above-described conventional information-providing system is configured such that, when an information is presented, the user attribute value, which represents the user's interest by a numeric value, is sent and received between the information-provider terminal and information-user terminal. Thus, there is a possibility that the user attribute information may be externally leaked out by tapping during transmission. Although the user attribute information is the information of the user's interest which is represented by a numeric value, the user's personal information is revealed, if analyzed. Consequently, protection of the user's privacy has been insufficient.

SUMMARY OF THE INVENTION

Accordingly, the present invention addresses such an unsolved problem with the conventional technique, and an object of the invention is to provide a service providing system that is suited to increase security of the user's privacy by preventing the user's personal information from externally leaking out, and to provide a service-providing terminal, a client terminal, and a storage medium.

In order to address the above-described object, a service providing system according to a first aspect of the present invention is a service-providing system in which a service-providing terminal that provides a service and a client terminal that receives a service are connected and capable of communication, and a service corresponding to service content selected from a plurality of service contents is provided in response to a service-providing request from the client terminal. The service-providing terminal includes: a list-sending device that sends a list of service-selection information which is to be a factor of selecting the service content in response to the service-providing request; a service-selection device that selects a service content to provide from the plurality of service contents based on the selection result of the service-selection information when receiving the selection result from the client terminal; and a service-providing device that provides the client terminal with the service content selected by the service-selection device. The client terminal includes: a user-information storing device that stores user information regarding a user; an information-selecting device that selects the service-selection information from the list of the service selection information based on the user information of the user-information storing device when receiving the list of the service-selection information from the service-providing terminal; and a selection-result sending device that sends a selection result of the information-selecting device to the service-providing terminal.

With this arrangement, in order to receive a service, a service-providing request is sent to the service-providing terminal from the client terminal.

When the service-providing terminal receives the service-providing request, a list-sending device sends a list of service-selection information to the client terminal in response to the service-providing request.

When the client terminal receives the list of service-selection information, service-selection information is selected from the list of service-selection information by information-selecting device based on user information of user-information storing device, and a selection result is sent to the service-providing terminal by a selection-result sending device When the service-providing terminal receives the selection result of the service-selection information, a service content to provide is selected from a plurality of service contents by the service-selection device based on the received selection result, and a service corresponding to the selected service content is provided for a client terminal by the service-providing device.

Here, the services include, for example, a content-distribution service that distributes a digital content suited to user's individuality (for example, interest and preferences), a layout service that performs automatic layout suited to user's individuality, or a search service that searches information that matches user's individuality from the database. The same description as above can be made to a service-providing terminal according to a sixth aspect, a client terminal according to a tenth aspect, a storage medium in which a service-providing program according to a thirteenth aspect is stored, and a storage medium in which a service-providing request program according to a fourteenth aspect is stored.

Also, a user-information storing device stores user information by all available devices/methods and at any time. Thus, user information can be stored in advance, or it may not be stored in advance but may be stored by input and so on from outside when the present system is running. The same description as above can be made to the client terminal according to the tenth aspect.

Furthermore, a service-providing system according to a second aspect of the present invention is a service-providing system according to the first aspect, wherein the service-providing terminal includes a service-reference information sending device that sends service-reference information indicating references of a plurality of service content included in a list of the service-selection information to the client terminal, and the client terminal includes a user-information update device that updates user information of the user-information storing device based on the service-reference information when receiving the service-reference information from the service-providing terminal.

With this arrangement, the service-providing system sends the service-reference information to the client terminal by the service-reference information sending device.

When the service-reference information is received, the client terminal updates the user information of the user-information storing device based on the received service-reference information by the user-information update device.

Here, the service-reference information sending device may send the service-reference information together with a list of service-selection information, or independently of the list of service-selection information. In the former case, the service-reference information can be sent, for example, in response to the service-providing request from the client terminal, and in the latter case, for example, in response to the service-reference information sending request from the client terminal. The same description as above can be made to a service-providing terminal according to a seventh aspect.

Moreover a service-providing system according to a third aspect of the present invention is a service-providing system according to the second aspect, wherein the user information includes interest information regarding a user's interest or preferences, and the user-information update device adds new interest information to the user information, updates the interest information in the user information to new interest information, or deletes the interest information of the user information based on the service-reference information.

With this arrangement, the client terminal adds new interest information to the user information, updates interest information of the user information to a new interest information, or deletes interest information of the user information by a user-information update device based on the received service-reference information.

Furthermore, a service providing system according to a fourth aspect is a service-providing system according to the first aspect, wherein the service-providing terminal includes: a service-reference information storing device that stores service-reference information indicating references of a plurality of service contents included in a list of the service-selection information; and a service-reference information update device that updates service-reference information of the service-reference information storing device based on the selection result of the service-selection information when receiving the selection result from the client terminal.

With this arrangement, when receiving the selection result of the service-selection information, the service-providing terminal updates the service-reference information of the service-reference information storing device based on the received selection result by the service-reference information update device.

Here, the service-reference information storing device stores the service-reference information by all available devices/methods and at any time. Thus, the service-reference information can be stored in advance, or it may not be stored in advance but may be stored by input and so on from outside when the present system is running. The same description as above can be made to a service-providing terminal according to an eighth aspect.

Also, a service-providing system according to the fourth aspect may include the following arrangement additionally. Specifically, in the service-providing system according to the fourth aspect, a list-sending device creates a list of the service-selection information based on the service-reference information of service-reference information storing device. The same description as above can be made to a service-providing terminal according to the eighth aspect.

With this arrangement, when receiving a service-providing request, the service-providing terminal creates a list of service-selection information based on the service-reference information of the service-reference information storing device by a list sending device in response to the received service-providing request, and the created list of service-selection information is sent to the client terminal. Then, when the selection result of the service-selection information is received, the service-reference information of the service-reference information storing device is updated based on the received selection result by the service-reference information update device.

As a result, a user can get an advantage that when he or she repeats receiving a service, he or she is capable of not only receiving service content which directly matches his or her interest and tastes, but also receiving service content which is indirectly related to his or her interest and tastes.

Moreover, a service providing system according to a fifth aspect of the present invention is a service-providing system according to the fourth aspect, wherein the service-reference information update device adds a new reference to the service-reference information, updates a reference of the service-reference information to a new reference, or deletes a reference of the service-reference information based on the selection result.

With this arrangement, the service-providing terminal adds a new reference to the service-reference information, updates a reference in the service-reference information to a new reference, or deletes a service-reference in the service reference information based on the received selection result by the service-reference information update device.

At the same time, in order to achieve the above object, a service-providing terminal according to the sixth aspect of the present invention is a service-providing terminal which is applied to the service-providing system according to any one of the first to fifth aspects, wherein the service-providing terminal includes: a list-sending device that sends a list of service-selection information which is to be a factor of selecting the service content in response to the service-providing request to the client terminal; a service-selection device that selects service content to provide from the plurality of service contents based on the selection result of the service-selection information when receiving the selection result from the client terminal; and a service-providing device that provides the client terminal with a service corresponding to the service content selected by the service-selection device.

With this arrangement, the same operation as that of the service-providing terminal in the service-providing system according to the first aspect can be obtained.

Furthermore, a service-providing terminal according to the seventh aspect of the present invention is a service-providing terminal according to the sixth aspect, further including a service-reference information sending device that sends service-reference information indicating references of a plurality of service contents included in a list of the service-selection information to the client terminal.

With this arrangement, the same operation as that of the service-providing terminal in the service-providing system according to the second aspect can be obtained.

Moreover, a service-providing terminal according to the eighth aspect of the present invention is a service-providing terminal according to the sixth aspect, further including a service-reference information storing device that stores service-reference information indicating references of a plurality of service contents included in a list of the service-selection information; and a service-reference information update device that updates service-reference information of the service-reference information storing device based on the selection result of the service-selection information when receiving the selection result from the client terminal.

With this arrangement, the same operation as that of the service-providing terminal in the service-providing system according to the fourth aspect can be obtained.

Furthermore, a service-providing terminal according to a ninth aspect of the present invention is a service-providing terminal according to the eighth aspect, wherein the service-reference information update device adds a new reference to the service-reference information, updates a reference of the service-reference information to a new reference, or deletes a reference of the service-reference information based on the selection result.

With this arrangement, the same operation as that of the service-providing terminal in the service-providing system according to the fifth aspect can be obtained.

At the same time, in order to address the above object, a client terminal according to the tenth aspect of the present invention is a client terminal which is applied to the service-providing system according to any one of the first to fifth aspects, wherein the client terminal includes: a user-information storing device that stores user information regarding a user; an information-selecting device that selects the service-selection information from a list of the service selection information based on user information of the user-information storing device when receiving the list of the service-selection information from the service-providing terminal; and a selection-result sending device that sends a selection result of the information-selecting device to the service-providing terminal.

With this arrangement, the same operation as that of the client terminal in the service-providing system according to the first aspect can be obtained.

Moreover, a client terminal according to an eleventh aspect of the present invention is a client terminal according to the tenth aspect, further including a user-information update device that updates user information of the user-information storing device based on the service-reference information when receiving the service-reference information from the service-providing terminal.

With this arrangement, the same operation as that of the client terminal in the service-providing system according to the second aspect can be obtained.

Furthermore, a client terminal according to a twelfth aspect of the present invention is a client terminal according to the eleventh aspect, wherein the user information includes interest information regarding a user's interest or preferences, and the user-information update device adds new interest information to the user information, updates the interest information of the user information to new interest information, or deletes the interest information of the user information based on the service-reference information.

With this arrangement, the same operation as that of the client terminal in the service-providing system according to the third aspect can be obtained.

At the same time, in order to achieve the above object, a storage medium with a service-providing program stored therein according to the thirteenth aspect of the present invention is a computer-readable storage medium with a service-providing program stored therein which is connected and capable of communication with the client terminal according to any one of the first to fifth aspects, and provides a service corresponding to the content selected from a plurality of service content in response to a service-providing request from the client terminal, wherein the program is implemented to execute the processing by a list-sending device that sends a list of service-selection information which is to be a factor of selecting the service content in response to the service-providing request to the client terminal, a service-selection device that selects service content from the plurality of service contents based on the selection result of the service-selection information when receiving the selection result from the client terminal, and a service-providing device that provides the client terminal with the service content selected by the service-selection device.

With this arrangement, the same operation as that of the service-providing terminal according to the sixth aspect can be obtained when the service-providing program stored in the storage medium is read into a computer, and the computer executes the program.

Moreover, a storage medium with a service-providing request program according to the fourteenth aspect of the present invention stored therein is a computer-readable storage medium with a service-providing request program stored therein which is connected and capable of communication with the service-providing terminal according to any one of the first to fifth aspects, and requests the service-providing terminal to provide a service corresponding to service content selected from a plurality of service contents, wherein the program is implemented to execute the processing in a computer comprising a user-information storing device that stores user information regarding a user, by a information-selecting device that selects the service-selection information from a list of the service selection information based on user information of the user-information storing device when receiving a list of the service-selection information from the service-providing terminal, and a selection-result sending device that sends a selection result of the information-selecting device to the service-providing terminal.

With this arrangement, the same operation as that of the client terminal according to the tenth aspect can be obtained when the service-providing request program stored in the storage medium is read into a computer, and the computer executes the program.

BRIEF DESCRIPTION OF THE DRAWINGS

FIG. 4 is a chart illustrating the data structure of a content list 300;

FIG. 5 is a schematic illustrating the configuration of a client terminal $C_1$;

FIG. 13 is a chart illustrating the data structure of a user-profile table 320;

FIG. 15 is a chart illustrating the data structure of a content-information registration table 340.

DETAILED DESCRIPTION OF PREFERRED EMBODIMENTS

Hereinafter, a first embodiment of the present invention will be described with reference to the drawings. FIGS. 1 to 8 illustrate the first embodiment of a service providing system, a service providing terminal, a client terminal, and a storage medium according to the present invention.

Figure 1:
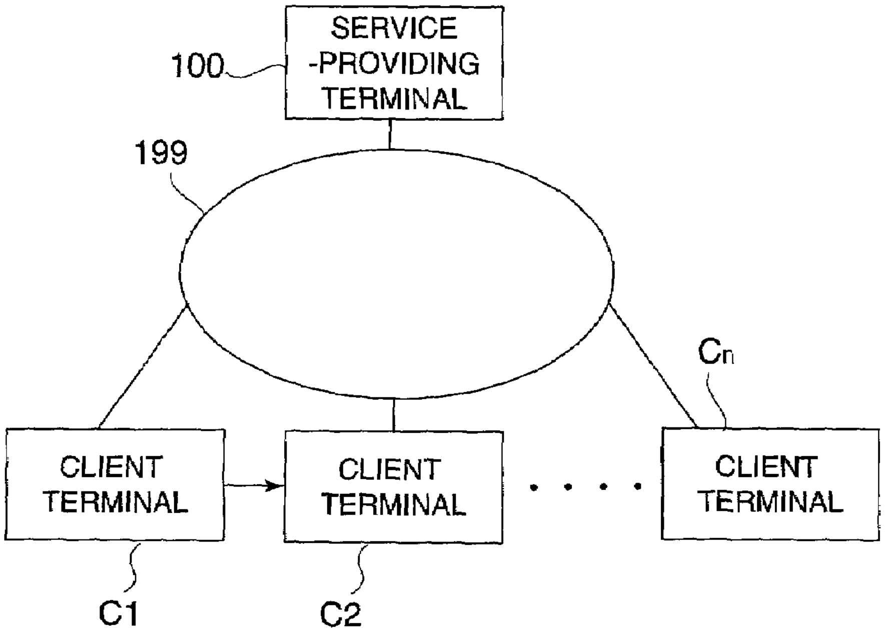
FIG. 1 is a schematic illustrating the configuration of a network system to which the present invention is applied.

In the present embodiment, as shown in FIG. 1, a service-providing system, a service-providing terminal, a client terminal, and a storage medium according to the present invention are applied to a case where the service-providing terminal 100 provides a service of distributing digital content that is suited to a user's interest and preferences among a plurality of pieces of digital content to the client terminals $C_1$ to $C_n$.

First, the configuration of a network system to which the present invention is applied will be described with reference to FIG. 1. FIG. 1 is a schematic illustrating the configuration of a network system to which the present invention is applied.

With the Internet 199, as shown in FIG. 1, the service-providing terminal 100 which provides services of storing a plurality of digital contents and distributing digital content to a user, and a plurality of client terminals $C_1$ to $C_n$ for use by users are connected. In this regard, when one of the client terminals $C_1$ to $C_n$ is hereinafter indicated, a client terminal C may be used as a generic name.

Figure 2:
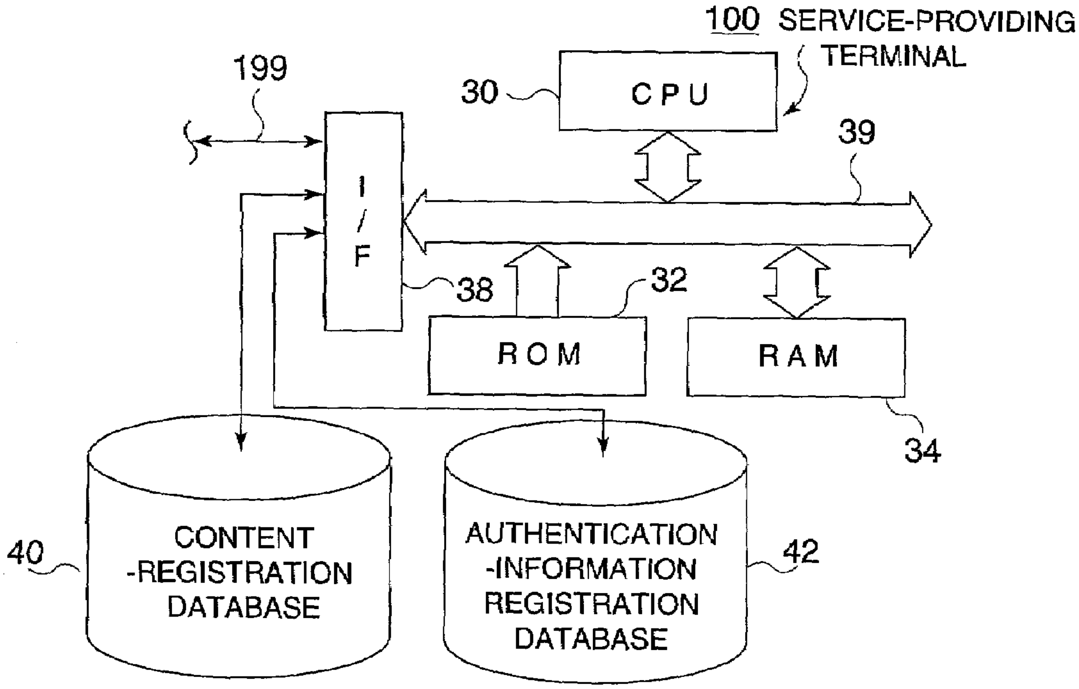
FIG. 2 is a schematic illustrating the configuration of a service-providing terminal 100.

Next, the configuration of the service-providing terminal 100 will be described in detail with reference to FIG. 2. FIG. 2 is a schematic illustrating the configuration of a service-providing terminal 100.

As shown in FIG. 2, the service-providing terminal 100 includes a CPU 30 which controls operations and the overall system based on a control program, a ROM 32 which stores the control program of the CPU 30 and so on in a predetermined area in advance, a RAM 34 which stores data read from the ROM 32 and so on, and an operation result necessary during the operations of the CPU 30, and an I/F 38 which acts as an intermediary for data input and output with respect to external devices. These components are connected with each other in a data exchangeable manner with a bus 39 which is a signal line that transfers data.

With the I/F 38, a content-registration database (hereinafter, the database is abbreviated simply as DB.) 40 in which a plurality of digital content is stored, an authentication-information registration DB 42 in which authentication information is registered that authenticates a user from a client terminal C, and a signal line that connects to the Internet 199 are connected as external devices.

A content-registration DB 40 stores article information, such as news and so on, as digital content. The digital content is collected from, for example, a content-storage terminal, not shown in the figure, which stores and allows article information to be viewed on the Internet 199, and registered in the content-registration DB 40. At that time, a content-ID that identifies the digital content and a category code that indicates the category of the article content are added to the digital content collected from the content-storage terminal. The service-providing terminal 100 classifies the digital content based on the category code, and registers it in the content registration DB 40.

Next, the configuration of the CPU 30 and the processing which is executed on the CPU 30 will be described with reference to FIG. 3.

Figure 3:
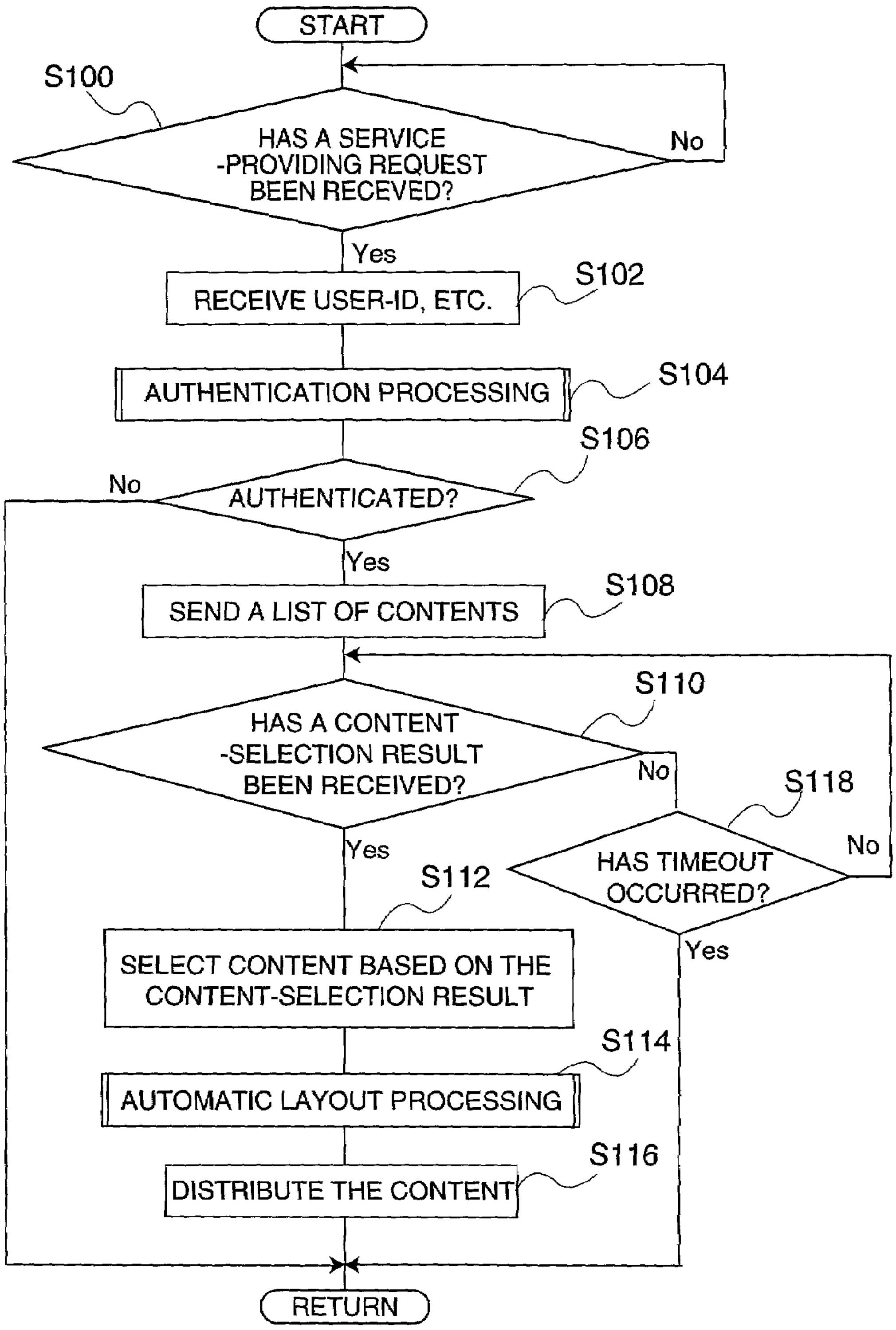
FIG. 3 is a flowchart illustrating the digital-content distribution processing.

The CPU 30 includes a micro-processing unit MPU and so on, and starts a predetermined program which is stored in a predetermined area of the ROM 32, and when the program is run, a digital-content distribution processing is executed as shown in the flowchart in FIG. 3. FIG. 3 is a flowchart illustrating the digital-content distribution processing.

The digital-content distribution processing is a processing to distribute the digital content suited to a user's interest and preferences among a plurality of digital contents to the client terminal C in response to the service-providing request from the client terminal C. When the digital-content distribution processing is executed by the CPU 30, the processing goes to step S100 first as shown in FIG. 3.

In step S100, it is determined whether or not the service-providing request from the client C has been received. If it is determined that the service-providing request has been received (Yes), the processing goes to step S102. If it is determined otherwise (No), the processing waits at the step S100 until receiving the service-providing request.

In step S102, a user-ID and a password are received from the client terminal C. The user-ID and password have been issued from the service-providing terminal 100 in advance, after a user of the client terminal C registered necessary user information. For issuing a user-ID and a password, a conventional issuing method is applied.

Next, the processing goes to step S104, where a user-authentication processing, which checks out received user-ID/password against authentication information in the authentication information registration DB 42, is executed. Then the processing goes to step S106, where it is determined whether or not the user is an authenticated user as a result of the authentication processing, and if it is determined as an authenticated user (Yes), the processing goes to step S108.

In step S108, a list of digital content registered in the content registration DB 40 is sent to the client terminal C. The content list has a structure as shown in FIG. 4. FIG. 4 is a chart illustrating the data structure of the content list 300.

As shown in FIG. 4, the content list 300 includes a table including the title of a piece of digital content which corresponds to a content-ID, and one record is registered for each piece of digital content in the table. Each record is structured including a field 302 which registers the content-ID and a field 304 which registers the title of the digital content. In the example in FIG. 4, in the first record, "1" is registered for the content-ID, and "Company A has released a desktop PC with 333 MHz Celeron on board for company use" is registered for the title. This device the digital content with the title "Company A has released a desktop PC with 333 MHz Celeron on board for company use" is identified by the content-ID "1". Specifically, in step S108, a content-ID and a title are extracted from each piece of digital content registered in the content registration DB 40, and a content list 300 is created based on the extracted content-ID and title, and then the created content list 300 is sent to the client terminal C.

Next, the processing goes to step S110, and it is determined whether or not a content-selection result, which is the selection result of the digital content from the content list 300, has been received from the client terminal C. If it is determined that the content-selection result has been received (Yes), the processing goes to step S112. Here, the content-selection result, which will be described later, is the content-ID of the digital content to be selected by the client terminal C from the content list 300.

In step S112, a piece of digital content is selected from the content registration DB 40 based on the received content-selection result, and the processing goes to step S114. Specifically, in step S112, the digital content identified by the content-ID, which is the content-selection result, is searched and retrieved from the content registration DB 40.

In step S114, an automatic layout processing, which decides an output layout of the selected digital content and does the layout, is executed, and the processing goes to step S116, and the laid out digital content is distributed to the client terminal C, and a series of the processing is completed to return to the original processing.

At the same time, if it is determined that the content-selection result has not been received (No) in step S110, the processing goes to step S118, and it is determined whether a predetermined time (for example, three minutes) has passed or not since a content list 300 was sent. If it is determined that the predetermined time has passed (Yes), a series of processing is completed. Thus, the processing returns to the original processing. If it is determined otherwise (No), the processing goes to step S110.

At the same time, if it is determined that the user is not authenticated as a regular user (No), in step S106, a series of the processing is completed to return to the original processing.

Next, the configuration of the client terminals $C_1$ to $C_n$ will be described in detail with reference to FIG. 5. FIG. 5 is a schematic illustrating the configuration of the client terminal $C_1$. In this regard, since the client terminals $C_1$ to $C_n$ are configured to have the same functions, the description will be only provided to the client terminal $C_1$, and the description of the other terminals will be omitted.

As shown in FIG. 5, the client terminal $C_1$ includes a CPU 50 which controls operations and the overall system based on a control program, a ROM 52 which stores the control program of the CPU 50 and so on in a predetermined area in advance, a RAM 54 which stores data read from the ROM 52 and so on, and an operation result necessary during the operations of the CPU 50, and an I/F 58 which acts as an intermediary for data input and output with respect to external devices. These components are connected with each other in a data exchangeable manner with a bus 59 which is a signal line that transfers data.

With the I/F 58, an input device 60 including keyboard, mouse, and so on which are capable of data entry as a human interface, a display unit 62 which displays screens based on an image signal, and a user-information registration DB 64 in which user information is registered, and a signal line that connects to the Internet 199 are connected as external devices.

Figures 6, 7:
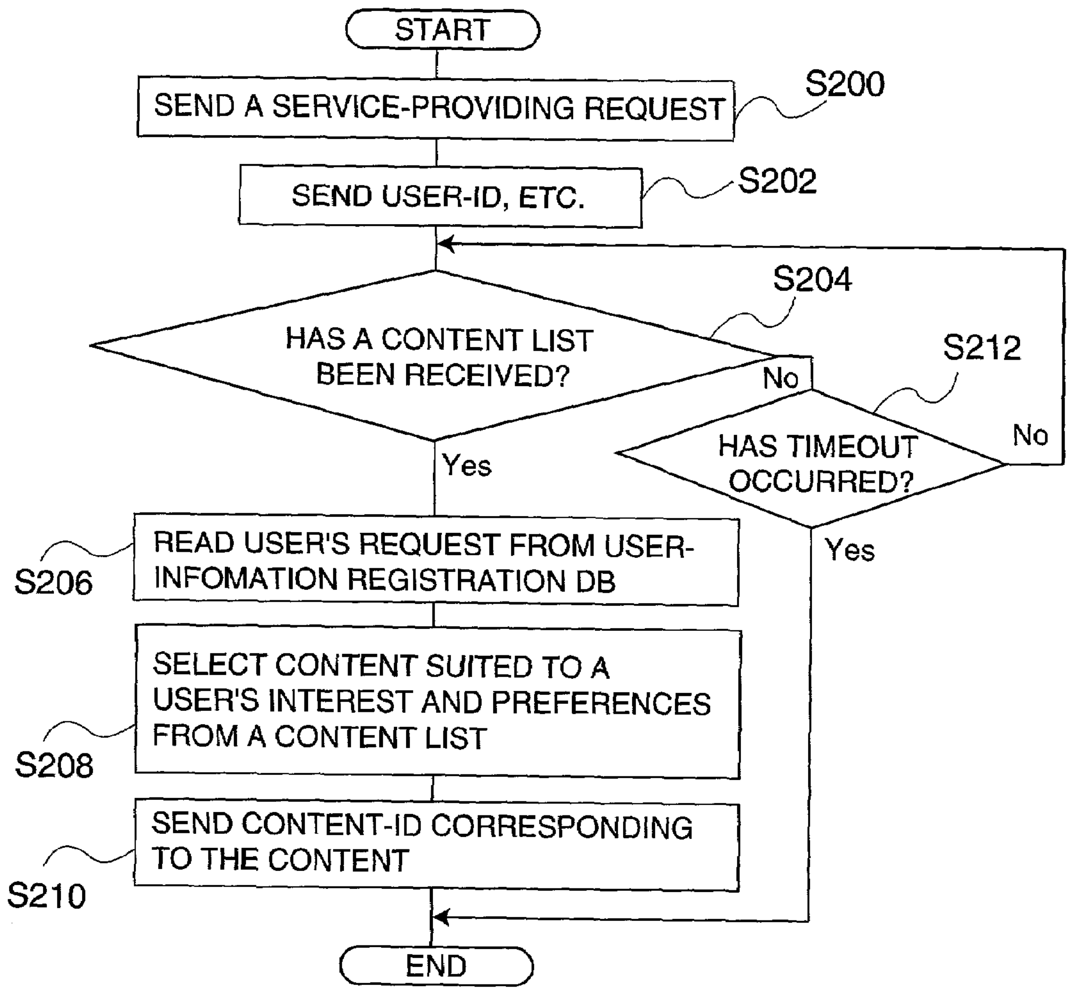
FIG. 6 is a chart illustrating the data structure of a user profile table 320.
FIG. 7 is a flowchart illustrating a service-providing request processing.

As shown in FIG. 6, in the user-information registration DB 64, a user-profile table 320 that registers user information is stored. FIG. 6 is a chart illustrating the data structure of the user-profile table 320.

As shown in FIG. 6, in the user-profile table 320, one or a plurality of records can be registered for each user. Each record includes a field 324 that registers user's request, and a field 322 that registers a severity of the request of the field 324.

In the field 324, the matters currently required by a user are registered in order to select digital content which is suited to user's interest and preferences from the content list 300. Specifically, digital content is selected by extracting the words which are suited to user's interest and preferences from requests in the field 324, and determining the degree of concordance of the words and the content list 300.

In an example in FIG. 6, as a request, "want a notebook PC on which Windows runs" is registered with the severity "0.5" in the first record. This shows that the ratio to be selected in comparison with the other digital content is "0.5" in selecting digital content which matches the request, "want a notebook PC on which Windows runs". In this regard, the severity is not an absolute index, but a relative index which is compared with the severity of the other digital content.

Although not shown in the figure, the user-information registration DB 64 stores user-ID and password to receive authentication at the service-providing terminal 100 in addition to the user-profile table 320. The user-ID and password that were issued at the service-providing terminal 100 when a user registered his/her user information are stored in the user-information registration DB 64.

Next, the configuration of the CPU 50 and the processing which are performed on the CPU 50 will be described with reference to FIG. 7.

The CPU 50 includes a micro-processing unit MPU and so on, and starts a predetermined program stored in a predetermined area of the ROM 52, and when the program is run, a service-providing request processing is executed as shown in the flowchart in FIG. 7. FIG. 7 is a flowchart illustrating a service-providing request processing.

The service-providing request processing is the processing that requests the service-providing terminal 100 to provide distribution of digital content, and when executed on the CPU 50, first goes to step S200 as shown in FIG. 7.

In step S200, a service-providing request is sent to the service-providing terminal 100, and the processing goes to step S202. There, the user-ID and password which is stored in the user-information registration DB 64 are sent to the service-providing terminal 100, and the processing goes to step S204.

In step S204, it is determined whether or not the content list 300 has been received from the service-providing terminal 100. If it is determined that the content list 300 has been received (Yes), the processing goes to step S206, and the user's request is read from the user-profile table 320, and then the processing goes to step S208.

In step S208, the digital content suited to the user's interest and preferences are selected from the content list 300 based on the read-out user's request. Specifically, in step S208, requests are read from the field 324 of the user-profile table 320, and then the words which seem to match a user's interest and preferences are extracted, and the degree of concordance between the extracted words and the titles of the content list 300 is determined, and the digital content having a high degree of concordance is retrieved.

Next, the processing goes to step S210, and the content-ID of the selected digital content is sent to the service-providing terminal 100 as a selection result, then a series of processing is completed.

At the same time, if it is determined that the content list 300 has not been received (No) in step S204, the processing goes to step S212, and it is determined whether a predetermined time (for example, three minutes) has passed or not since the user-ID and password were sent. If it is determined that the predetermined time has passed (Yes), a series of processing is completed, otherwise (No), the processing goes to step S204.

Figure 8:
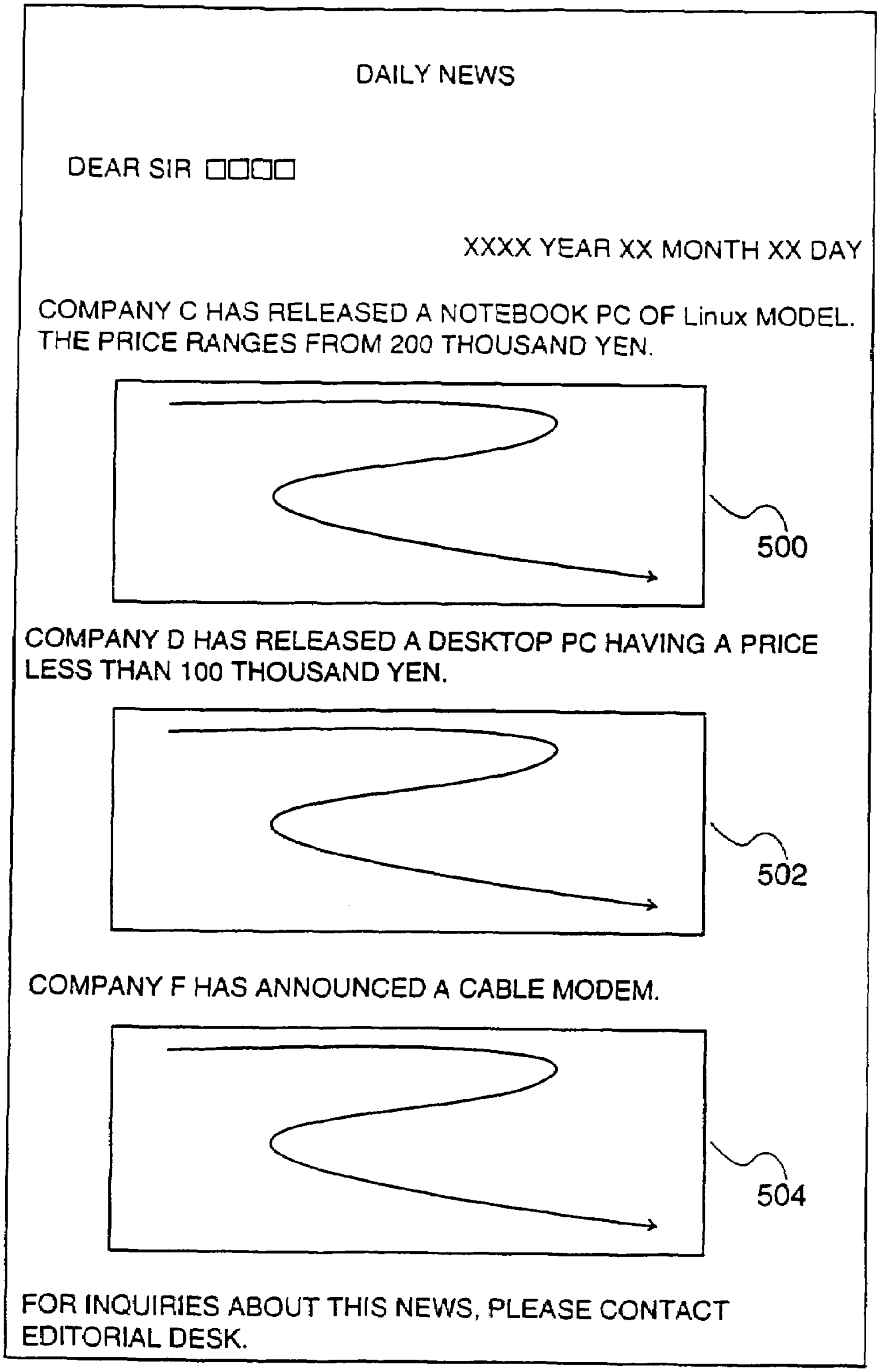
FIG. 8 is a schematic of a display screen showing the digital content which is distributed to a client terminal C.

Next, the operation of the first embodiment described above will be described with references to FIG. 8. FIG. 8 is a display screen showing the digital content which is to be distributed to a client terminal C.

A description will be provided below to a case where a user-profile table 320 including the content as shown in FIG. 6 is stored in the user-information registration DB64, and a content list 300 as shown in FIG. 4 is sent from the service-providing terminal 100 to the client terminal $C_1$.

When hoping to receive a digital-content distribution service, a user of the client terminal $C_1$ first enters a direction to provide a service into the client terminal $C_1$ In the client terminal $C_1$, when service providing is directed by a user, the processing goes through steps S200 and S202, and a service-providing request is sent to the service-providing terminal 100, and at the same time, the user-ID and password which were issued from the service-providing terminal 100 by performing the user registration in advance are sent to the service-providing terminal 100.

In the service-providing terminal 100, when a service-providing request is received, the processing goes through steps S200 and S202, and then the user authentication processing is performed based on the received user-ID and password. As a result, if the user is authenticated as a regular user, the processing goes to step S108, and the content list 300 is sent to the client terminal $C_1$.

In the client terminal $C_1$, when receiving the content list 300 having the content as shown in FIG. 4, the processing goes to steps S206 and S208, and the following processing is executed.

First, as requests, "want a notebook PC on which Windows runs", "scheduled to get the budget of 200 thousand yen out of the next bonus", and "want to connect PC to the Internet by a cable modem" are read from the user-profile table 320 respectively. From these requests, the words which seem to coincide with the user's interest and preferences, that are, "Windows", "notebook PC", "about 200 thousand yen", "cable modem", and "Internet" can be extracted. Then, by comparing each of the extracted words with each title of the content list 300, degree to which the extracted words are included in each title is determined.

As a result, as for a first digital content, the title is "Company A has released a desktop PC with 333 MHz Celeron on board for company use". Therefore, when the title is checked against each of the extracted words, it is found that the price is unknown, and the topic is not about a notebook PC which the user wants, and thus this is not selected as a digital content for distribution.

As for a second digital content, the title is "Company B has released a notebook PC of Windows 95 model having a price of 300 thousand yen or more", therefore, when the title is checked against each of the extracted words, it is found that the title is about a PC on which Windows runs, but the price is 300 thousand yen or more. Since the severity of the request regarding the price in the user-profile table 320 is relatively high, this is not selected as a digital content for distribution.

As for a third digital content, the title is "Company C has released a notebook PC of Linux model. The price ranges from 200 thousand yen." When the title is checked against each of the extracted words, it is found that the title is not about the Windows model, but it is a notebook PC, and the price is relatively near the price which the user wants, and thus this is selected as a digital content for distribution.

As for a fourth digital content, the title is "Company D has released a desktop PC having a price less than 100 thousand yen." When the title is checked against each of the extracted words, an OS is unknown, and it is not a notebook PC, but it meets the user's request of the price which has a relatively high severity. Thus, this is selected as a digital content for distribution.

As for a fifth digital content, the title is "Company E has released a mobile phone on which Java is installed." When the title is checked against each of the extracted words, it is found that the title is about neither Windows nor a notebook PC, and thus this is not selected as a digital content for distribution.

As for a sixth digital content, the title is "Company F has announced a cable modem." When the title is checked against each of the extracted words, it is found that the user is interested in a cable modem, and there is a possibility of purchasing it at the same time of a notebook PC. Thus, this is selected as a digital content for distribution.

After the third, fourth, and sixth digital content among the first to sixth digital content are selected as pieces of digital content for distribution in this manner, the respective content-Ids, "3", "4", and "6" are sent to the service-providing terminal 100 as selection results through step S210.

In the service-providing terminal 100, when the content-IDs "3", "4", and "6" are received as selection results, the pieces of the digital content identified by the received content-IDs are selected from the content registration DB 40, and an output layout is determined for the selected digital content and performed through steps S112 and S114. Then, through step S116, the digital content having the final layout is distributed to the client terminal $C_1$.

In the client terminal $C_1$, the digital content is received and displayed on to the display unit 62, which is shown as in FIG. 8. In an example in FIG. 8, a third digital content in the content list 300 is arranged in the area 500, and a fourth digital content is arranged in the area 502, and a sixth digital content is arranged in the area 504.

In this manner, in the present embodiment, the service-providing terminal 100 sends the content list 300 to the client terminal C in response to the service-providing request. When receiving the selection result of the digital content from the client terminal C, the service-providing terminal selects the digital content to distribute among a plurality of digital contents based on the selection result, and then distributes the selected digital content to the client terminal C. The client terminal C has the user-information registration DB 64 in which user information is registered. When receiving the content list 300 from the service-providing terminal 100, the client terminal selects content-IDs from the content list 300 based on the user information in the user-information registration DB 64, and sends the selection result to the service-providing terminal 100.

Consequently, when distribution service of digital content is performed, only the selection result of the digital content is transmitted, and a user's personal information is not transmitted. Accordingly, the possibility of leakage of a user's personal information is reduced. As a result, comparing with the conventional method, the method can protect a user's privacy to some extent.

In the first embodiment described above, the digital content corresponds to the service content according to the first, sixth, tenth, thirteenth or fourteenth aspects. The content-ID corresponds to the service-selection information according to the first, sixth, tenth, thirteenth or fourteenth aspects. The content list 300 corresponds to the list of service-selection information according to the first, sixth, tenth, thirteenth or fourteenth aspects. Also, the user-information registration DB 64 corresponds to the user-information storing device according to the first, tenth or fourteenth aspects, and the step S108 corresponds to the list-sending device according to the first, sixth or thirteenth aspects, and the step S112 corresponds to the service-selection device according to the first, sixth or thirteenth aspects. Moreover, the step S116 corresponds to the service-providing device according to the first, sixth or thirteenth aspects, and the step S208 corresponds to the information-selecting device according to the first, tenth or fourteenth aspects, and the step S210 corresponds to the selection-result sending device according to the first, tenth or fourteenth aspects.

Next, a second embodiment of the present invention will be described with reference to the drawings. FIGS. 9 to 13 show a second embodiment of a service-providing system, a service-providing terminal, a client terminal, and storage medium according to the present invention. Description will only be provided to features that differ from the first embodiment. The same reference numerals will be given to the portions that overlap with the first embodiment, and the discussion thereof will be omitted.

In the present embodiment, as shown in FIG. 1, a service-providing system, a service-providing terminal, a client terminal, and a storage medium according to the present invention are applied to a case where the service-providing terminal 100 provides a service of distributing digital content that is suited to a user's interest and preferences among a plurality of pieces of digital content to the client terminals $C_1$ to $C_n$. What differs from the first embodiment is that in the client terminal C, the user-profile table 320 is updated based on the content-reference information sent from the service-providing terminal 100.

Figures 9, 10:
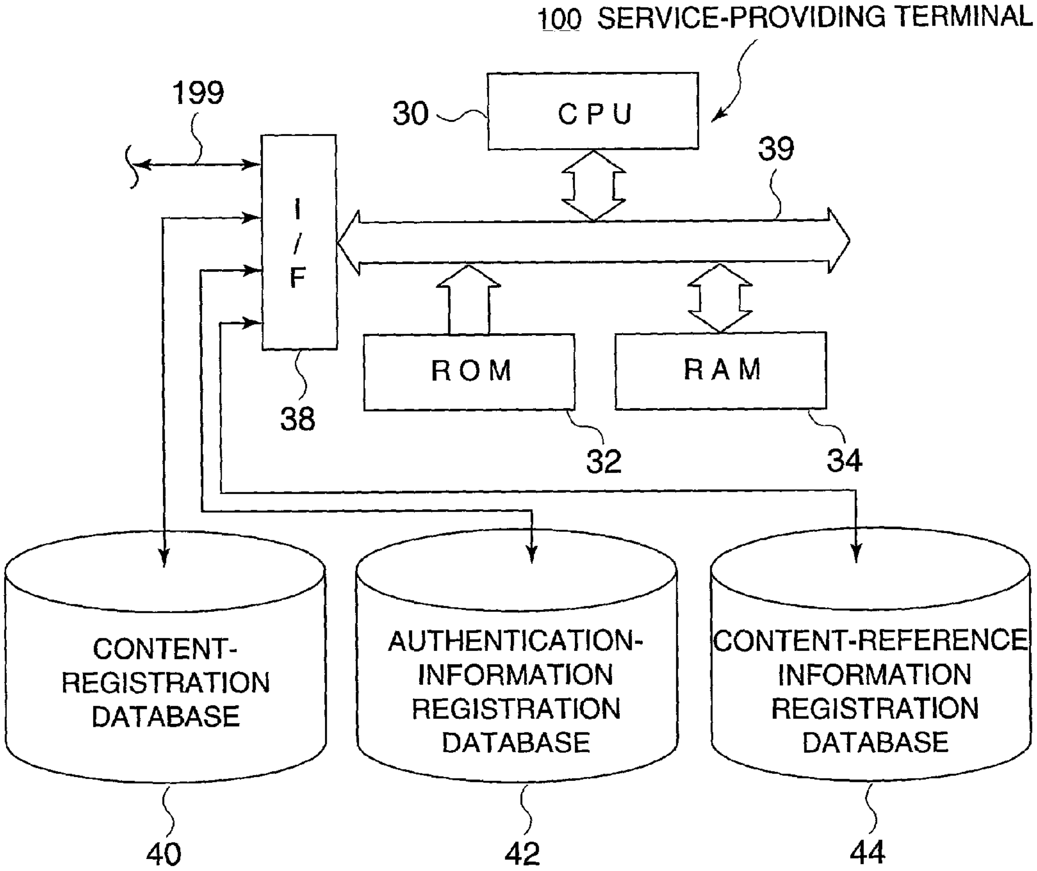
FIG. 9 is a schematic illustrating the configuration of a service-providing terminal 100.
FIG. 10 is a chart illustrating the data structure of a content-reference information registration table 340.

First, the configuration of the service-providing terminal 100 will be described with reference to FIG. 9. FIG. 9 is a schematic illustrating the configuration of the service-providing terminal 100.

As shown in FIG. 9, the service-providing terminal 100 includes a CPU 30, a ROM 32, a RAM 34, and an I/F 38, and these components are connected with each other in a data exchangeable manner with a bus 39.

With the I/F 38, a content-registration DB 40, an authentication-information registration DB 42, a content-reference information registration DB 44 that stores the content-reference information indicating references of a plurality of digital contents stored in the content-registration DB 40, and a signal line that connects to the Internet 199 are connected as external devices.

As shown in FIG. 10, in the content-reference information registration DB 44, a content-reference information registration table 340 where content reference information is registered is stored. FIG. 10 is a chart illustrating the data structure of the content-reference information registration table 340.

As shown in FIG. 10, in the content-reference information registration table 340, one record or more can be registered for a piece of digital content having references. Each record includes a field 342 that registers a content-ID, a field 344 that registers the content-ID of the digital content which relates to the digital content identified by the content-ID of the field 342, and a field 346 that registers the degree of reference between the pieces of digital content identified by the content-IDs of the fields 342 and 344.

In an example in FIG. 10, in the first record, the content-IDs "1" and "4" of the pieces of the digital content related to each other are registered to the degree of reference "0.2". This means that the digital content identified by content-ID "1" and the digital content identified by content-ID "4" are related to each other, and the degree of reference is "0.2". Here, the degree of reference between the content-ID "1" and content-ID "4" is "0.2", because they are both articles about PCs. The degree of reference between the content-ID "2" and content-ID "3" is "0.5", because they are both articles about notebook PCs. The degree of reference between the content-ID "3" and content-ID "5" is "0.7", because they are articles about Linux, Java, and mobile phone, which lately draw attention in business. In this regard, the degree of reference is not an absolute index, but a relative index with respect to the degree of reference of the other pieces of the digital content.

Figure 11:
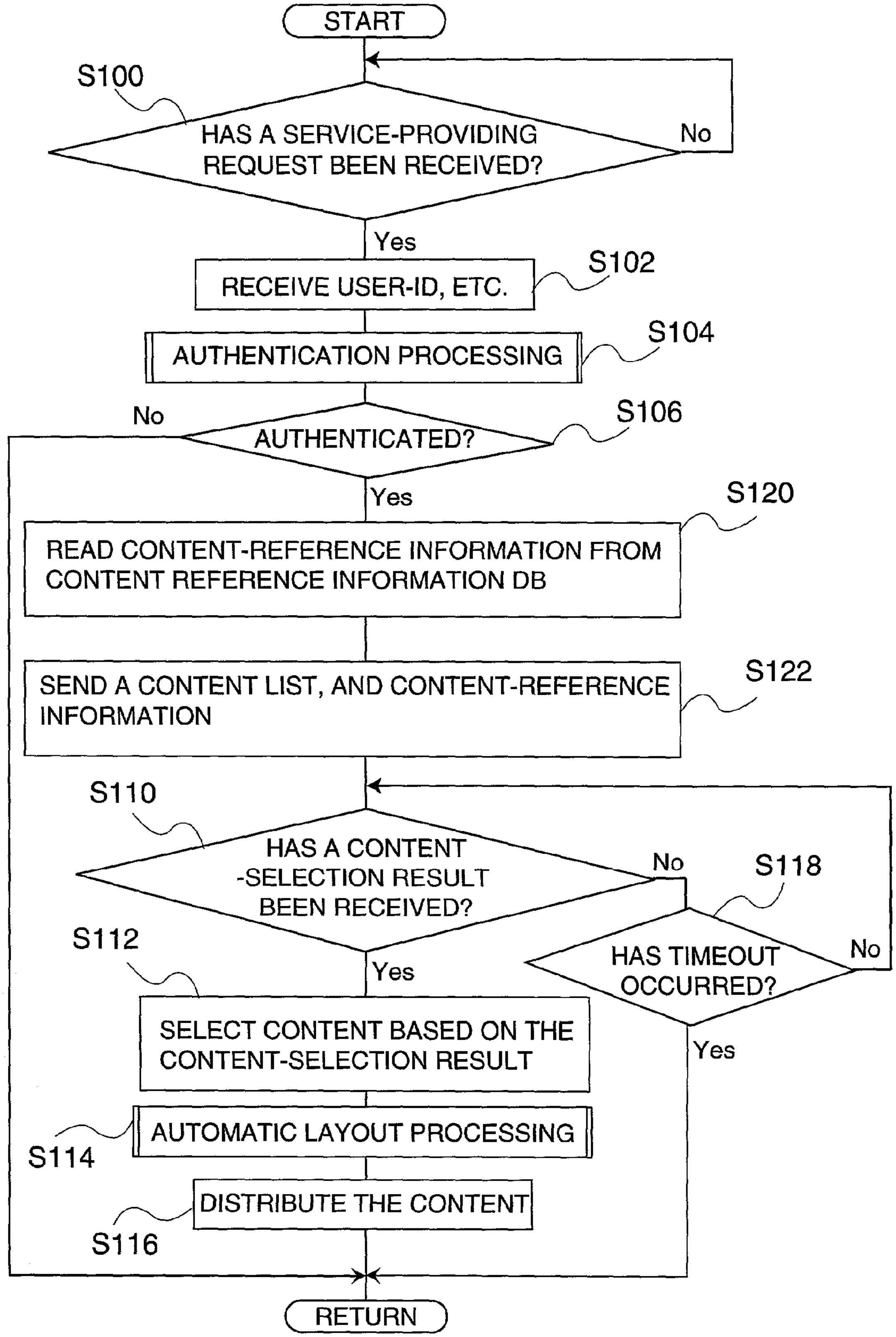
FIG. 11 is a flowchart illustrating the digital-content distribution processing.

Next, a digital-content distribution processing which is executed on the service-providing terminal 100 will be described with reference to FIG. 11. FIG. 11 is the flowchart illustrating the digital-content distribution processing.

The digital-content distribution processing goes to step S100 first when executed by the CPU 30 as shown in FIG. 11.

In step S100, it is determined whether or not the service-providing request has been received. If it is determined that the service-providing request has been received (Yes), the processing goes to step S102. If it is determined otherwise (No), the processing waits at the step S100 until receiving the service-providing request.

In step S102, a user-ID and a password are received, and the processing goes to step S104, where a user-authentication processing is executed based on the received user-ID and password, and the processing goes to step S106. It is determined whether or not the user is authenticated as a result of the authentication processing, and if it is determined as authenticated (Yes), the processing goes to step S120.

In step S120, a content-reference information registration table 340 (hereinafter, referred to simply as content-reference information 340) is read from the content-reference information registration DB 44, and the processing goes to step S122, and the content list 300 and the content-reference information 340 are sent to the client terminal C, and the processing goes to step S110.

In step S110, it is determined whether or not a content-selection result has been received. If it is determined that the content-selection result has been received (Yes), the processing goes to step S112, and the digital content is selected from the content-registration DB 40 based on the received content-selection result, and the processing goes to step S14.

In step S14, an automatic layout processing of the selected digital content is executed, and the processing goes to step S116, and the laid out digital content is distributed, and a series of the processing is completed to return to the original processing.

At the same time, if it is determined that the content-selection result has not been received (No) in step S110, the processing goes to step S118, and it is determined whether a predetermined time has passed or not since a content list 300 and content-reference information 340 were sent. If it is determined that the predetermined time has passed (Yes), a series of processing is completed. The processing then returns to the original processing. If it is determined otherwise (No), the processing goes to step S110.

At the same time, if it is determined that the user is not authenticated (No) in step S106, a series of the processing is completed to return to the original processing.

Figure 12:
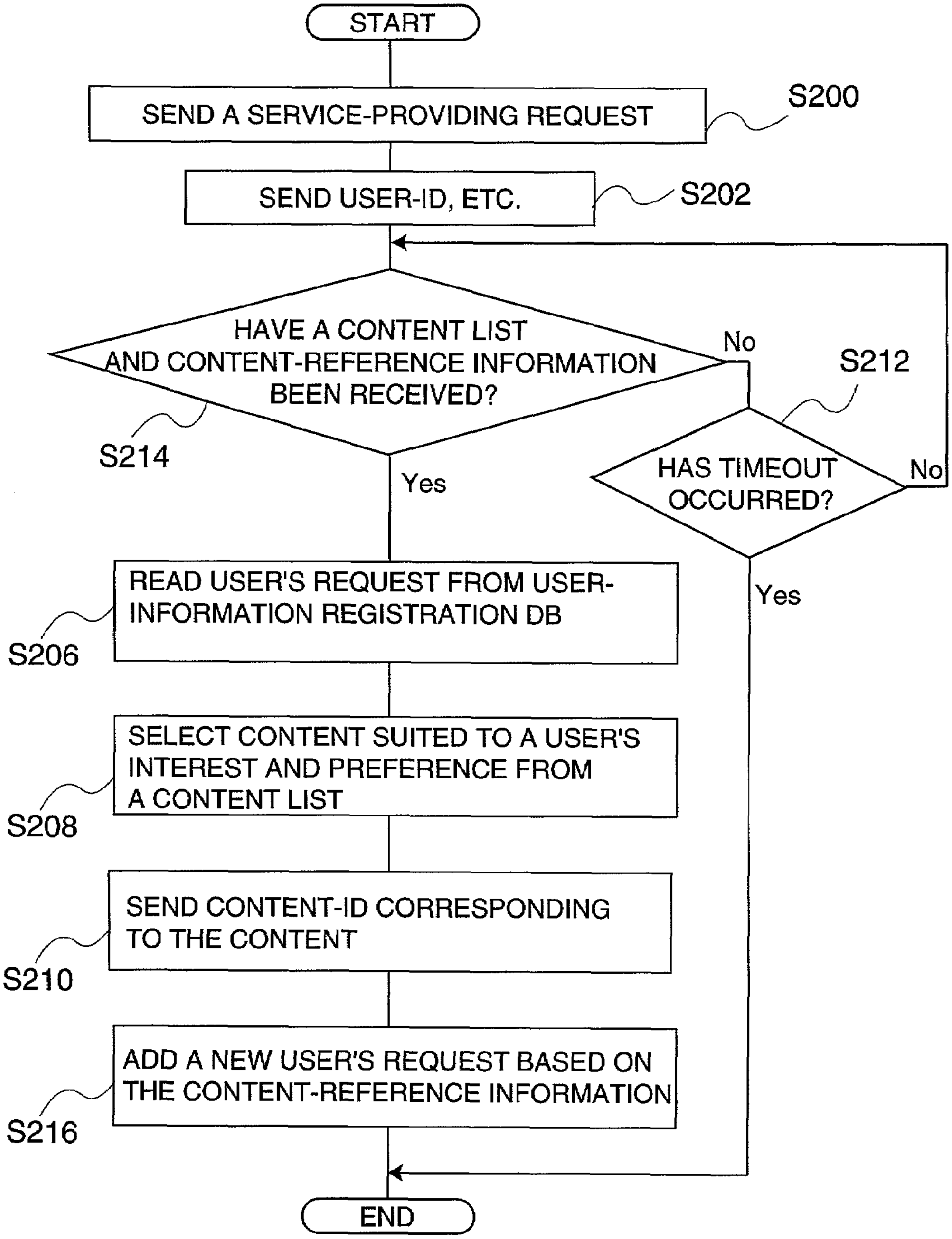
FIG. 12 is a flowchart illustrating a service-providing request processing.

Next, the service-providing request processing which is performed on the client terminals $C_1$ will be described with reference to FIG. 12. FIG. 12 is the flowchart illustrating a service-providing request processing.

When the service-providing request processing is executed on the CPU 50, the processing goes to step S200 first as shown in FIG. 12.

In step S200, a service-providing request is sent, and the processing goes to step S202. There the user-ID and password are sent, and the processing goes to step S214.

In step S214, it is determined whether or not the content list 300 and the content-reference information 340 have been received from the service-providing terminal 100. If it is determined that the content list 300 and the content-reference information 340 have been received (Yes), the processing goes to step S206, and the user's request is read from the user-profile table 320, and then the processing goes to step S208.

In step S208, the digital content which is suited to the user's interest and preferences is selected among the content list 300 based on the read out user's request, and the processing goes to step S210. There, the content-ID of the selected digital content is sent as a selection result, and the processing goes to step S216. There, a new user request is added to the user-profile table 320 based on the received content-reference information 340, and a series of the processing is completed.

At the same time, if it is determined that the content list 300 and the content-reference information 340 have not been received (No) in step S214, the processing goes to step S212, and it is determined whether a predetermined time has passed or not since the user-ID and password were sent. If it is determined that the predetermined time has passed (Yes), a series of processing is completed. Otherwise (No), the processing goes to step S214.

Next, the operation of the second embodiment described above will be described with reference to FIG. 13. FIG. 13 is a chart illustrating the data structure of a user-profile table 320.

Description will be provided below to a case where a user-profile table 320 having the content as shown in FIG. 6 is stored in the user-information registration DB 64, and a content list 300 as shown in FIG. 4 is sent from the service-providing terminal 100 to the client terminal $C_1$.

In the client terminal $C_1$, when service providing is directed by a user, a service-providing request, user-ID and password are sent to the service-providing terminal 100.

In the service-providing terminal 100, when a service-providing request is required, the user authentication processing is performed based on the received user-ID and password. As a result, if the user is authenticated as a regular user, the processing goes to steps S120 and S122, and the content-reference information 340 is read from the content-reference information registration DB 44, and the content list 300 and the read-out content-reference information 340 are sent to the client terminal $C_1$.

In the client terminal $C_1$, when the content list 300 having the content as shown in FIG. 4 is received, in the same manner as the first embodiment described above, the third, fourth, and sixth digital content among the first to sixth digital content are selected as pieces of digital content for distribution, and the respective content-IDs "3", "4", and "6" are sent to the service-providing terminal 100 as selection results.

Then, the processing goes to step S216, and a new user request is added to the user-profile table 340 based on the received content-reference information 340. Specifically, the digital content having reference to the digital content selected in step S208 is selected based on the content-reference information 340. In this case, the selected content-IDs are "3", "4", and "6". With reference to the content-reference information 340, the content-IDs "1" and "4", content-IDs "2" and "3", and content-IDs "3" and "5" are related to each other, respectively. Thus, the content-ID "1" having reference to the selected content-ID "4", and the content-ID "2" and "5" having reference to the selected content-ID "3" are selected. Among these, the most highest degree of reference is the digital content identified by the content-ID "5", thus, as shown in FIG. 13, from the title which corresponds to the content-ID "5", a new user request "A mobile phone on which Java is installed" is extracted, and the newly extracted request is added to the user-profile table 320.

Here, the severity of a newly added request is computed. For example, it is computed by multiplying the degree of concordance with the title corresponding to the content-ID "3" by the degree of reference of content-IDs "3" and "5". For example, given that the degree of concordance with the title corresponding to the content-ID "3" is "0.7", the severity of the newly added request is computed by "$0.7\times 0.5$", that is, "0.35".

In this way, when a new request is added to the user-profile table 320, in the subsequent distribution service, not only the digital content which directly meets a user's interest and preferences, but also the digital content which indirectly meets a user's interest and preferences is distributed.

In such a way, in the present embodiment, the service-providing terminal 100 sends the content-reference information 340 to the client terminal C, and the client terminal C updates the user information of the user-profile table 320 based on the received content-reference information 340 when receiving the content-reference information 340.

With this method, in addition to the effect of the first embodiment described above, a user can receive the distribution of not only the digital content which directly meets a user's interest and preferences, but also that of the digital content which indirectly meets a user's interest and preferences as the user repeats receiving the distribution services.

In the second embodiment described above, a user's request corresponds to the interest information according to the third or twelfth aspects, and the step S112 corresponds to the service-reference information sending device according to the second or seventh aspects, and the step S216 corresponds to the user-reference information update device according to the second, third, eleventh or twelfth aspects.

Moreover, in the second embodiment described above, the digital content corresponds to the service content according to the first, second, sixth, seventh, tenth, thirteenth or fourteenth aspects, and the content-ID corresponds to the service-selection information according to the first, second, sixth, seventh, tenth, thirteenth or fourteenth aspects, and the content list 300 corresponds to the service-selection information list according to the first, second, sixth, seventh, tenth, thirteenth or fourteenth aspects. Also, the user-information registration DB 64 corresponds to the user-information storing device according to the first, tenth or fourteenth aspects, and the step S108 corresponds to the list-sending device according to the first, sixth or thirteenth aspects, and the step S112 corresponds to the service-selection device according to the first, sixth or thirteenth aspects. Moreover, the step S116 corresponds to the service-providing device according to the first, sixth or thirteenth aspects, and the step S208 corresponds to the information-selecting device according to the first, tenth or fourteenth aspects, and the step S210 corresponds to the selection-result sending device according to the first, tenth or fourteenth aspects.

Figure 14:
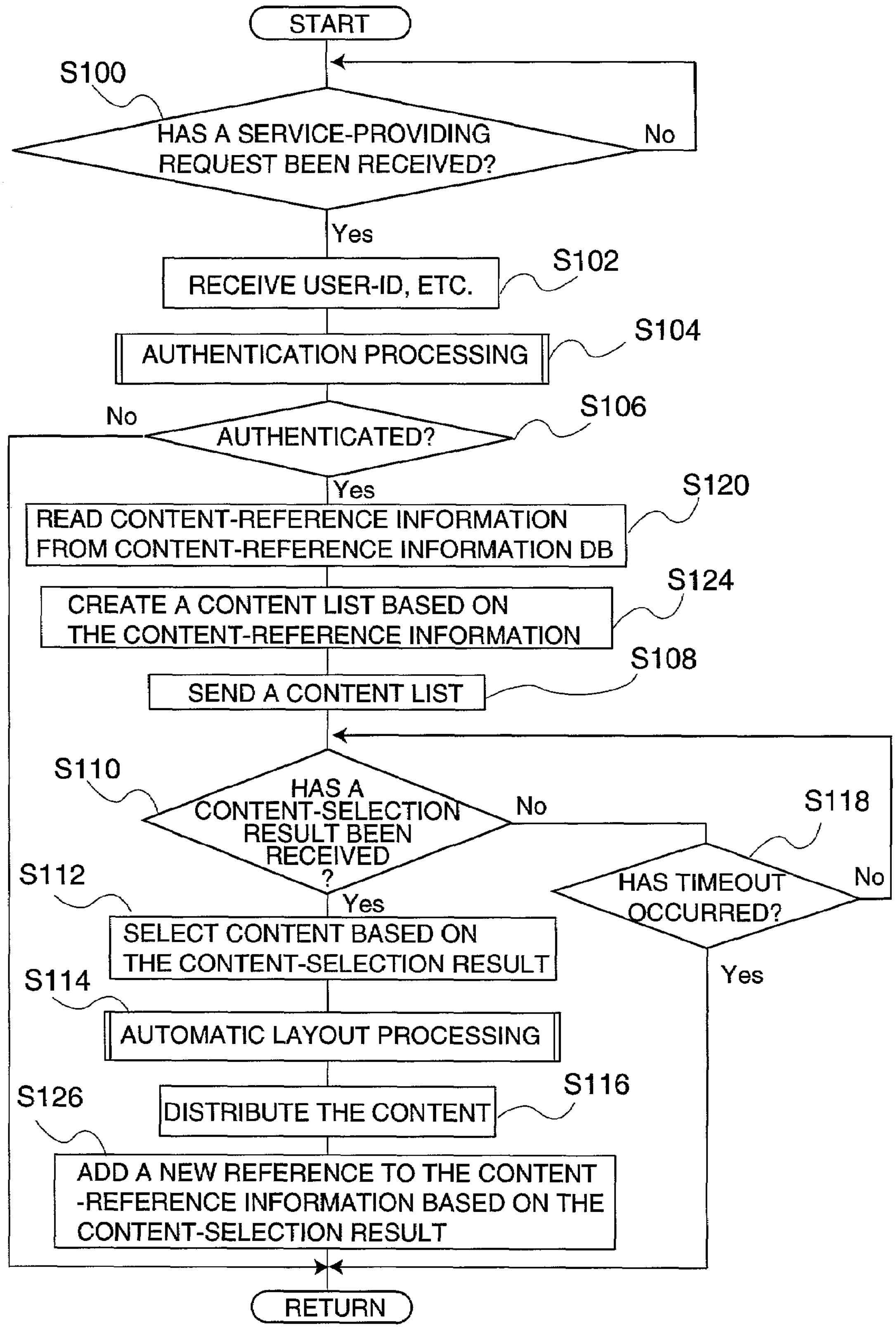
FIG. 14 is a flowchart illustrating the digital-content distribution processing.

Next, a third embodiment of the present invention will be described with reference to the drawings. FIGS. 14 and 15 show a third embodiment of a service-providing system, a service-providing terminal, a client terminal, and a storage medium according to the present invention. In this regard, in the following, a description will only be provided to features that differ from the second embodiment, and the same reference numerals will be given to the portions that overlap with the second embodiment. Description thereof will be omitted.

In the present embodiment, as shown in FIG. 1, a service-providing system, a service-providing terminal, a client terminal, and a storage medium according to the present invention are applied to a case where the service-providing terminal 100 provides a service of distributing digital content suited to a user's interest and preferences among a plurality of pieces of digital content to the client terminals $C_1$ to $C_n$. What differs from the first embodiment is that the content-reference information is updated on the service-providing terminal 100 based on the selection result from the client terminal C.

First, the digital-content distribution processing which is executed on the service-providing terminal 100 will be described with reference to FIG. 14. FIG. 14 is the flowchart illustrating the digital-content distribution processing.

The digital-content distribution processing first proceeds to step S100 when executed by the CPU 30 as shown in FIG. 14.

In step S100, it is determined whether or not the service-providing request has been received. If it is determined that the service-providing request has been received (Yes), the processing goes to step S102. If it is determined otherwise (No), the processing waits at the step S100 until receiving the service-providing request.

In step S102, a user-ID and a password are received, and the processing goes to step S104, where a user-authentication processing is executed based on the received user-ID and password, and the processing goes to step S106. It is determined whether or not the user is authenticated as a result of the authentication processing, and if it is determined as authenticated (Yes), the processing goes to step S120.

In step S120, a content-reference information 340 is read from the content-reference information registration DB 44, and the processing goes to step S1124, and the content list 300 is created based on the read-out content-reference information 340. Specifically, in the step S124, the content-reference information 340 is referenced, and the pieces of the digital content having references are selected, and the selected digital content is placed on the content list 300. By this method, when a large number of pieces of the digital content are registered, it is possible to avoid the problem that the information becomes complicated by containing the digital content with little references in the content list 300.

Next, the processing goes to step S108, and the created content list 300 is sent to the client terminal C, and the processing goes to step S110, and it is determined whether or not a content-selection result has been received. If it is determined that the content-selection result has been received (Yes), the processing goes to step S112, and the digital content is selected from the content-registration DB 40 based on the received content-selection result, and the processing goes to step S14.

In step S14, an automatic layout processing of the selected digital content is executed, and the processing goes to step S16, and the laid out digital content is distributed. Then, the processing goes to step S126, and a new reference is added to the content-reference information 340 based on the received content-selection result, and a series of the processing is completed to return to the original processing.

At the same time, if it is determined that the content-selection result has not been received (No) in step S110, the processing goes to step S118, and it is determined whether a predetermined time has passed or not since a content list 300 and content-reference information 340 were sent. If it is determined that the predetermined time has passed (Yes), a series of processing is completed, and thus the processing returns to the original processing. If it is determined otherwise (No), the processing goes to step S110.

At the same time, if it is determined that the user is not authenticated (No) in step S106, a series of the processing is completed to return to the original processing.

In this regard, on the client terminal $C_1$, the service-providing request processing as shown by the flowchart in FIG. 3 is executed instead of the service-providing request processing as shown by the flowchart in FIG. 12.

Next, the operation of the third embodiment described above will be described with reference to FIG. 15. FIG. 15 is a chart illustrating the data structure of the content-information registration table 340.

Description will be provided below to a case where on the client terminal $C_1$, a user-profile table 320 having the content as shown in FIG. 6 is stored in the user-information registration DB 64, and the content list 300 with the content as shown in FIG. 4 is sent from the service-providing terminal 100 to the client terminal $C_1$.

In the client terminal $C_1$, when service providing is directed by a user, a service-providing request, user-ID and password are sent to the service-providing terminal 100.

In the service-providing terminal 100, when a service-providing request is received, the user authentication processing is performed based on the received user-ID and password. As a result, if the user is authenticated as a regular user, the processing goes to steps S120, S124 and S108, and the content-reference information 340 is read from the content-reference information registration DB 44. The content list 300 is created based on the read-out content-reference information 340 and then sent to the client terminal $C_1$.

In the client terminal $C_1$, when the content list 300 having the content as shown in FIG. 4 is received, in the same manner as the first embodiment described above, the third, fourth, and sixth digital content among the first to sixth digital content are selected as pieces of digital content for distribution, and the respective content-IDs "3", "4", and "6" are sent to the service-providing terminal 100 as selection results.

In the service-providing terminal 100, when the content-IDs "3", "4", and "6" as selection results are received, the pieces of the digital content which are identified by the received content-IDs are selected from the content registration DB 40, and the selected digital content are laid out. The laid-out digital content is then distributed to the client terminal $C_1$.

Then the processing goes to step S126, and a new reference is added to the content-reference information 340 based on the received content-selection result. Specifically, the pieces of digital content which are identified by the content-IDs selected at the client terminal $C_1$ at the same time are related to each other. Thus, for example, 0.1 is added to each degree of reference. In an example in FIG. 15, for the first to the third record, 0.1 is added to each degree of reference compared with the content of the content-reference information registration table 340 shown in FIG. 10. Also, the reference of the content-IDs "3" and "4", the reference of the content-IDs "3" and "6", and the reference of the content-IDs "4" and "6" are added as three records. At this time, each degree of reference of the added records is set to 0.1.

In this manner, when a new reference is added to the content-reference information 340, in the subsequent distribution service, not only the digital content which directly meets a user's interest and preferences, but also the content list 300 including the digital content which indirectly relates to a user's interest and preferences is distributed.

In such a way, in the present embodiment, the service-providing terminal 100 has the content-reference information registration DB 44 which stores the content-reference information 340, and creates a content list 300 based on the content-reference information 340, and updates the content-reference information 340 of the content-reference information registration DB 44 based on the received selection result when receiving a selection result of the digital content from the client terminal C.

By this method, in addition to the effect of the first embodiment described above, a user can receive the distribution of not only the digital content which directly meets a user's interest and preferences, but also that of the digital content which indirectly meets a user's interest and preferences as the user repeats receiving the distribution services.

Also, in the present embodiment, content-IDs are transferred as the selection result of digital content between the service-providing terminal 100 and the client terminal C.

By this method, data transfer amount between the service-providing terminal 100 and the client terminal C can be reduced as compared to the case where a title or body text of digital content is sent as a selection result of digital content.

In the third embodiment described above, the content-reference information registration DB 44 corresponds to the service-reference information storing device according to the fourth or eighth aspects, and the step S126 corresponds to the service-reference information update device according to the fourth, fifth, eighth or ninth aspects.

Moreover, in the third embodiment described above, the digital content corresponds to the service content according to the first, fourth, sixth, eighth, tenth, thirteenth or fourteenth aspects, and the content-ID corresponds to the service-selection information according to the first, fourth, sixth, eighth, tenth, thirteenth or fourteenth aspects, and the content list 300 corresponds to the service-selection information list according to the first, fourth, sixth, eighth, tenth, thirteenth or fourteenth aspects. Also, the user-information registration DB 64 corresponds to the user-information storing device according to the first, tenth or fourteenth aspects, and the step S108 corresponds to the list-sending device according to the first, fourth, sixth, eighth, or thirteenth aspects, and the step S112 corresponds to the service-selection device according to the first, sixth or thirteenth aspects. Moreover, the step S116 corresponds to the service-providing device according to the first, sixth or thirteenth aspects, and the step S208 corresponds to the information-selecting device according to the first, tenth or fourteenth aspects, and the step S210 corresponds to the selection-result sending device according to the first, tenth or fourteenth aspects.

In this regard, in the first to the third embodiments described above, the title of digital content is placed on the content list 300, but the present invention is not limited to this, and the whole text of digital content may be placed on the list.

Also, in the first to the third embodiments described above, content-ID is placed on the content list 300, but the present invention is not limited to this, and only title or the whole text of digital content may be placed on the list.

Moreover, in the first to the third embodiments described above, the content-ID is transferred as a selection result of digital content between the service-providing terminal 100 and the client terminal C, but the present invention is not limited to this, and if a title is placed on the content list 300, the title may be transferred, whereas if the whole text is placed on the content list 300, the whole text or a part of it (for example, a predetermined number of characters from the top) may be transferred.

Also, in the first to the third embodiments described above, a user's information is formed of a user's request and severity, but the present invention is not limited to this, and a user's information may include user name, age, address, telephone number or mail address. A user's information may be character information, but also it may be managed as numeric information such as a histogram, vector, and matrix.

Moreover, in the first to the third embodiments described above, article information such as a news is distributed as digital content, but the present invention is not limited to this, and multimedia data such as music data, image data, and so on may be distributed as digital content.

Also, in the first to the third embodiments, as for execution of the processing shown in the flowcharts in FIGS. 3, 7, 11, 12, and 14, a description has been provided to the case where a control program, which is stored in the ROM 32 or 52 in advance, is executed. However, the present invention is not limited to this, and the program indicating these procedures may be stored in a storage medium, and the program may be executed by being read into the RAM 34 or RAM 54.

Here, the storage medium may be a computer-readable storage medium of any kind, and irrespective of any reading method such as electronic, magnetic, optical, and so on, including semiconductor memory medium, such as a RAM and ROM, magnetic memory medium, such as FD and HD, optical reading memory medium, such as CD, CDV, LD, and DVD, and magnetic storage/optical reading method memory medium, such as a MO and so on.

Moreover, in the first to the third embodiments described above, a description is provided to the case where a service providing system, a service providing terminal, a client terminal, and a storage medium according to the present invention are applied to a network which is formed of the Internet 199, but the present invention is not limited to this, and may be applied to, for example, an intranet using the same communication method as the Internet 199. Of course, the present invention is not limited to a network using the same communication method as the Internet 199, but can be applied to a usual network.

Also, in the first to the third embodiments described above, a service providing system, a service providing terminal, a client terminal, and a storage medium according to the present invention are applied to the case where the service-providing terminal 100 provides a service for distributing the digital content suited to a user's interest and preferences among a plurality of digital contents to the client terminal C as shown in FIG. 1, but the present invention is not limited to this, and can be applied to the other cases without departing from the spirit of the present invention. For example, the present invention can be applied to the case where a layout service that performs an automatic layout to suit a user's individuality, or a search service that searches information suited to a user's individuality is provided.

As described above, by the service-providing system of the present invention, only a selection result of the service-selection information is transferred between the service-providing terminal and the client terminal when a service is provided, and thus a user's personal information is not transferred. Therefore, the possibility that a user's personal information externally leaks out can be reduced. Accordingly, an effect of protecting a user's privacy can be obtained to a greater extent than before.

Furthermore, by the service-providing system of the present invention, an effect can be obtained that a user can receive not only service content which directly meets a user's interest and preferences, but also service content which indirectly meets a user's interest and preferences as the user repeats receiving the services.

In addition, by the service-providing system of the present invention, an effect can be obtained that while the possibility that a user's personal information externally leaks out decreases, a service corresponding to the content which indirectly meets a user's interest and preferences can be grasped at the side of the service-providing terminal.

Also, by the service-providing terminal of the present invention, the same effect can be obtained as the service-providing system described above.

Moreover, by the client terminal of the present invention, the same effect can be obtained as the service-providing system described above.

The invention claimed is:

1. A service-providing system, comprising:

a service-providing terminal that provides a service; and a client terminal that receives a service, the service-providing and client terminals being connected and capable of communication, and a service corresponding to service content selected from a plurality of service contents being provided in response to a service-providing request from the client terminal;

the service-providing terminal including:

a list-sending device that sends a list of service-selection information which is to be a factor of selecting the service content in response to the service-providing request;

a service-selection device that selects a service content to provide from the plurality of service contents based on a selection result of the service-selection information when receiving the selection result from the client terminal;

a service-providing device that provides the client terminal with a service corresponding to the service content selected by the service-selection device; and a service-reference information sending device that sends service-reference information indicating references of a plurality of service content included in the list of the service-selection information to the client terminal; and the client terminal including:

a user-information storing device that stores user information regarding a user;

an information-selecting device that selects the service-selection information from the list of the service selection information based on the user information of the user-information storing device when receiving the list of the service-selection information from the service-providing terminal;

a selection-result sending device that sends a selection result of the information-selecting device to the service-providing terminal; and a user-information update device that updates the user information of the user-information storing device based on the service-reference information when receiving the service-reference information from the service-providing terminal, the user information including interest information regarding a user's interest or preferences, the user-information update device adding new interest information to the user information, automatically updating the interest information in the user information to new interest information, or deleting the interest information in the user information based on the service-reference information.

2. The service-providing system according to claim 1, the service-providing terminal including:

a service-reference information storing device that stores service-reference information indicating references of a plurality of service contents included in the list of the service-selection information; and a service-reference information update device that updates the service-reference information of the service-reference information storing device based on the selection result of the service-selection information when receiving the selection result from the client terminal.

3. The service-providing system according to claim 2, the service-reference information update device adding a new reference to the service-reference information, updating a reference of the service-reference information to a new reference, or deleting the reference of the service-reference information based on the selection result.

4. A computer-readable storage medium for storing a service-providing program which is connected and capable of communication with the client terminal according to claim 1, and provides a service corresponding to service content selected from a plurality of service contents in response to a service-providing request from the client terminal, the storage medium comprising:

a list-sending program for sending a list of service-selection information which is to be a factor of selecting the service content in response to the service-providing request to the client terminal;

a service-selection program for selecting service content to provide from the plurality of service content based on the selection result of the service-selection information when receiving the selection result from the client terminal; and a service-providing program for providing the client terminal with the service content selected by the service-selection program.

5. A computer-readable storage medium for storing a service-providing request program which is connected and capable of communication with the service-providing terminal according to claim 1, and requests the service-providing terminal to provide a service corresponding to service content selected from a plurality of service contents, the storage medium comprising:

a user-information storing program for storing user information regarding a user;

an information-selecting program for selecting the service-selection information from the list of the service information based on the user information of the user-information storing program when receiving the list of the service-selection information from the service-providing terminal; and a selection-result sending program for sending a selection result of the information-selecting program to the service-providing terminal.

6. The service-providing system according to claim 1, wherein the user-information storing device mathematically calculates an importance of new interest information by calculating an importance of selected content and an importance of related content.

7. The service-providing system according to claim 1, wherein the service-providing terminal further includes a service-reference information update device that updates a degree of relevance of selected content based upon content simultaneously selected by the client terminal.

8. A service-providing terminal which is applied to a service-providing system that comprises the service-providing terminal that provides a service; and a client terminal that receives a service, the service-providing and client terminals being connected and capable of communication, and a service corresponding to service content selected from a plurality of service contents being provided in response to a service-providing request from the client terminal;

the client terminal including:

a user-information storing device that stores user information regarding a user;

an information-selecting device that selects the service-selection information from the list of the service selection information based on the user information of the user-information storing device when receiving the list of the service-selection information from the service-providing terminal; and a selection-result sending device that sends a selection result of the information-selecting device to the service-providing terminal; and wherein the service-providing terminal comprises:

a list-sending device that sends a list of service-selection information which is to be a factor of selecting the service content in response to the service-providing request to the client terminal;

a service-selection device that selects the service content to provide from the plurality of service content based on the selection result of the service-selection information when receiving the selection result from the client terminal; and a service-providing device that provides the client terminal with the service corresponding to the service content selected by the service-selection device.

9. The service-providing terminal according to claim 8, further comprising a service-reference information sending device that sends service-reference information indicating references of a plurality of service content included in the list of the service-selection information to the client terminal.

10. The service-providing terminal according to claim 8, further comprising a service-reference information storing device that stores service-reference information indicating references of a plurality of service content included in the list of the service-selection information; and a service-reference information update device that updates the service-reference information of the service-reference information storing device based on the selection result of the service-selection information when receiving the selection result from the client terminal.

11. The service-providing terminal according to claim 10, the service-reference information update device adding a new reference to the service-reference information, updating a reference of the service-reference information to a new reference, or deleting the reference of the service-reference information based on the selection result.

12. A client terminal which is applied to a service-providing system that comprises a service-providing terminal that provides a service; and the client terminal that receives a service, the service-providing and client terminals being connected and capable of communication, and a service corresponding to service content selected from a plurality of service contents being provided in response to a service-providing request from the client terminal;

the service-providing terminal including:

a list-sending device that sends a list of service-selection information which is to be a factor of selecting the service content in response to the service-providing request;

a service-selection device that selects a service content to provide from the plurality of service contents based on a selection result of the service-selection information when receiving the selection result from the client terminal; and a service-providing device that provides the client terminal with a service corresponding to the service content selected by the service-selection device; and wherein the client terminal comprises:

a user-information storing device that stores user information regarding a user;

an information-selecting device that selects the service-selection information from the list of the service selection information based on the user information of the user-information storing device when receiving the list of the service-selection information from the service-providing terminal; and a selection-result sending device that sends the selection result of the information-selecting device to the service-providing terminal.

13. The client terminal according to claim 12, further comprising a user-information update device that updates the user information of the user-information storing device based on the service-reference information when receiving the service-reference information from the service-providing terminal.

14. The client terminal according to claim 13, the user information including interest information regarding a user's interest or preferences, and the user-information update device adding new interest information to the user information, updating the interest information of the user information to new interest information, or deleting the interest information of the user information based on the service-reference information.

* * * * *